US005154568A

United States Patent [19]

Conner et al.

[11] Patent Number: 5,154,568

[45] Date of Patent: Oct. 13, 1992

[54] SIDE LOADING APPARATUS

[75] Inventors: Jack S. Conner, Topanga; Claude A. Brosterhous, Mission Viejo, both of Calif.

[73] Assignee: Conner & Brosterhous, Topanga, Calif.

[21] Appl. No.: 642,461

[22] Filed: Jan. 17, 1991

[51] Int. Cl.[5] .............................................. B65G 67/04

[52] U.S. Cl. .................................. 414/392; 187/9 R; 414/458; 414/785; 414/667; 414/671

[58] Field of Search ............... 414/399, 390, 391, 392, 414/393, 458, 785, 667, 671, 618, 621; 187/9 R, 9 E

[56] References Cited

U.S. PATENT DOCUMENTS

| | | | |
|---|---|---|---|
| 2,773,612 | 12/1956 | West et al. | 414/392 |
| 2,773,614 | 12/1956 | Edwards et al. | 414/458 |
| 2,792,079 | 5/1957 | Gibson | 187/9 R |
| 2,920,917 | 1/1960 | Sheehan . | |
| 3,528,569 | 9/1970 | Barry . | |
| 3,612,484 | 12/1971 | Gallagher et al. | 414/458 X |
| 3,785,515 | 1/1974 | Shaffer | 187/9 R X |
| 3,933,218 | 1/1976 | Oler et al. | 414/458 X |
| 3,937,301 | 2/1976 | Bertail | 187/9 R X |
| 4,093,084 | 6/1978 | Ringer . | |
| 4,124,129 | 11/1978 | Barry . | |
| 4,130,208 | 12/1978 | Barry . | |
| 4,139,107 | 2/1979 | Ninomiya . | |
| 4,715,766 | 12/1987 | Gebhardt . | |
| 4,746,257 | 5/1988 | Barry . | |
| 4,747,745 | 5/1988 | Pippen . | |

FOREIGN PATENT DOCUMENTS

| | | | |
|---|---|---|---|
| 2195608 | 4/1988 | United Kingdom | 414/785 |

*Primary Examiner*—Frank E. Werner
*Attorney, Agent, or Firm*—I. M. Bak-Boychuk

[57] ABSTRACT

A lifting assembly for lifting containers onto rail cars includes a substantially rectangular horizontal frame slidably mounted on vertical hoist assemblies each supported on a tracked undercarriage. The lateral separation between the hoists and the lateral dimensions of the frame are hydraulically adjustable to adjust the alignment of two cantilevered lifting beams which extend from the frame over the undercarriage. An operator housing that rides with the frame provides view exposure to the lifting alignment of the cantilevered beams.

5 Claims, 5 Drawing Sheets

SIDE LOADING APPARATUS

BACKGROUND OF THE INVENTION

1. Field of the Invention

The present invention relates to loading mechanisms for truck trailers onto railroad cars, and more particularly to side loading mechanisms for lifting trailers along the side of the railroad track.

2. Description of the Prior Art

The economies of shipping truck trailers on railroad cars are well recognized. In consequence, those engaged in the transportation of goods often resort to "intermodal" shipping, in which a variety of shipping methods is utilized. Since a large component of all freight ends up on the water a certain amount of standardization has occurred. Thus, the truck trailer now takes one of the forms necessary for handling a standardized container.

We note, with some emphasis, that these standardized trailer dimensions are particularly useful in the transfer between the highway and rail transportation modes. Thus, any exchange between railcar and truck is best effected by a transfer of a trailer with the container mounted thereon.

In consequence, those techniques earlier devised for manipulation of containers, alone, are often unsuitable for the transfer of the supporting trailer. Thus, the teachings of U.S. Pat. No. 4,124,129 to Barry; U.S. Pat. No. 4,130,208 to Barry; U.S. Pat. No. 4,715,766 to Gebhardt; U.S. Pat. No. 4,093,084 to Ringer and U.S. Pat. No. 4,139,107 to Ninomia et al; while suitable for the purposes intended, each accommodate the transfer of the container only. U.S. Pat. No. 4,746,257 to Barry, and U.S. Pat. No. 4,747,745 to Pippen et al, in turn, rely on complex pivotal mechanisms or overhead cranes to effect the transfer of the trailer itself.

The complexity and cost of overhead cranes, or raised loading platforms from which the trailer is pivoted, dictate fixed loading and unloading points along the rail line. This limiting aspect of large, fixed capital intensive loading facilities then limits the number of loading stations along the track. In consequence, full intermodal utility is often not realized because of the fixed character of the capital investment.

As result, techniques have been devised in the past which, on one way or another, effect loading transfer onto a rail line without extensive fixed capital equipment. One example thereof is described in U.S. Pat. No. 2,773,612 to West et al. While suitable for the purposes intended the structure of the '612 patent may be further improved, both for manipulative convenience and for structural efficacy. Such improvements are extensively sought and it is one such improvement that is disclosed herein.

SUMMARY OF THE INVENTION

Accordingly, it is the general purpose and object of the present invention to provide a mobile loading assembly conformed for a plurality of modes of motion in the course of lifting a trailer onto a rail car.

Other objects of the invention are to provide a track borne loading assembly conformed for selective pivotal motion.

Yet further objects of the invention are to provide a loading assembly which is both adjustable in span and in cantilevered deployment.

Further objects of the invention are to provide a trailer loading assembly which is conveniently moved to a site.

Briefly, these and other objects are accomplished within the present invention by providing a loading assembly characterized by a first and second hoisting column each supported on an endless track and each including a cantilevered hoisting beam selectively raised on the hoisting column to raise the trailer from ground. The two hoisting columns are engaged to each other by telescoping transverse beams which may be hydraulically controlled in their separation span and in their transverse position. The free ends of the beams extend beyond the hoisting columns to engage a corresponding lift pad at each end which may be used to fix the endless track in place and thus may form a pivot about which the other track is moved.

An operator enclosure is mounted on the transverse beams in substantial horizontal alignment with the cantilevered beams. Thus, the operator is positioned for viewing alignment along the plane of cantilevered beams. One should note that the transverse beams, the operator cabin and the cantilevered lifting beams are all joined to each other in a coplanar engagement which is extendable in width. This variable geometry platform is then in a vertically sliding engagement to the corresponding hoisting columns at each end.

To provide the necessary power for the endless track, the hoist mechanisms, the hydraulic cylinders controlling the span of the transverse beams, and the expansion of the lifting pads a power plant is mounted at the rear of the operator cabin which then drives a hydraulic pump. The hydraulic fluid, at pressure, is then useful to control a variety of hydraulic cylinders and motors effecting each function.

More precisely, each hoisting column includes a corresponding set of ascent chains tied at one end to the slide on the transverse beams. The ascent chains are then each looped over idler sprockets with the deployment length of the chains controlled by looped take-up effected by a hydraulic cylinder loaded in tension. This cylinder loading in tension allows for an extended span of vertical motion without the attendant bending moments associated with compression loading. A substantially smaller hydraulic cylinder is thus useful in the foregoing arrangement. A descent chain looped for opposite extension then relieves any jamming or binding of the slides in the course of downward motion along each hoisting column.

The hydraulic output of the pump is also selectively fed to a set of hydraulic motors engaged to each endless track and to a pair of hydraulic cylinders controlling the telescoping extension of the transverse beams. Thus, both the track advancement and the column lateral position may be coordinated in the course of hydraulic control.

Further control over motion may be achieved by selective hydraulic extension of lift pads at each end which then serve, separately, as pivots or collectively as a brake.

In this manner a fully mobile, controllable in span, lifting assembly is devised which may be used at any convenient rail station for trailer loading.

DESCRIPTION OF THE PREFERRED EMBODIMENT

Figure 1:
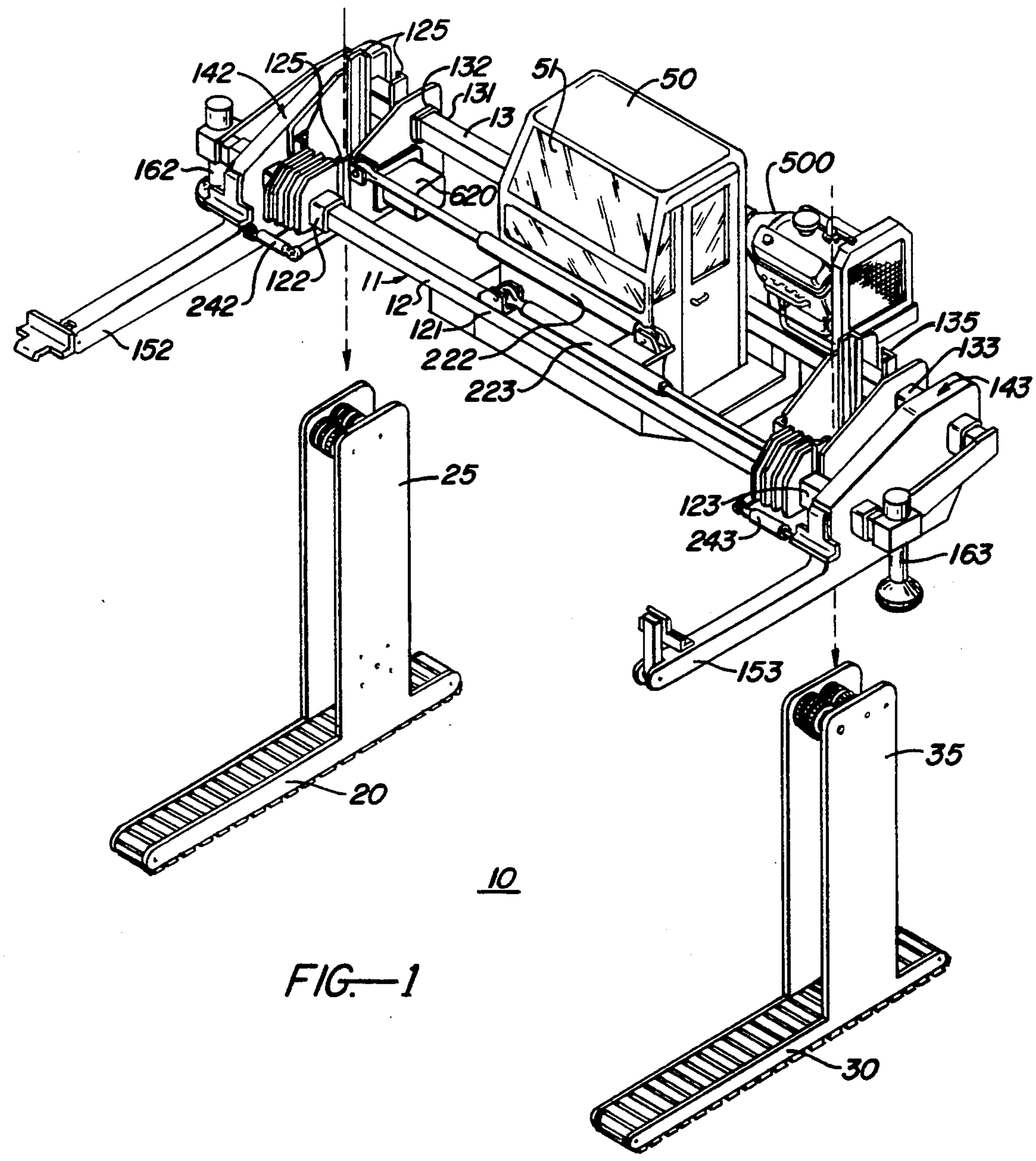
FIG. 1 is a perspective illustration, separated by parts, of the inventive lifting assembly.
Figure 2:
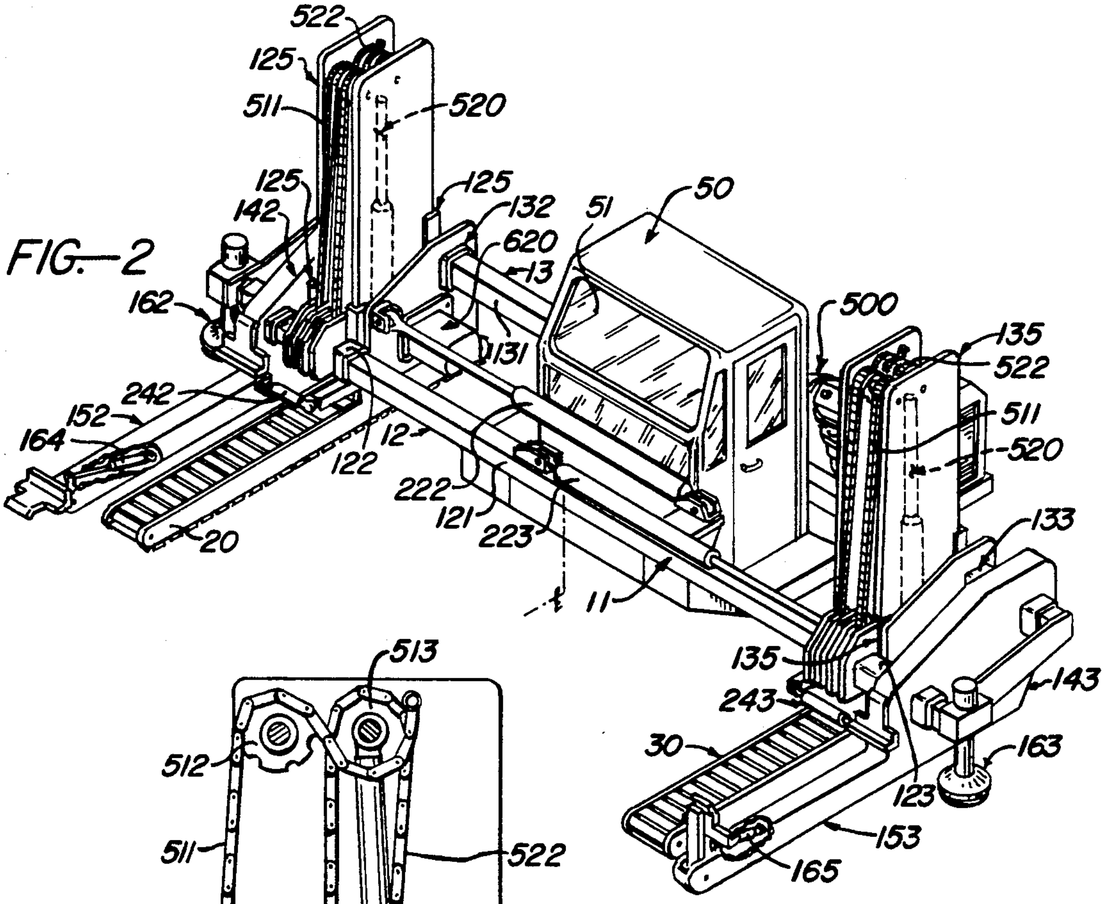
FIG. 2 is yet another perspective illustration of the inventive lifting assembly in its integrated form.
Figure 3:
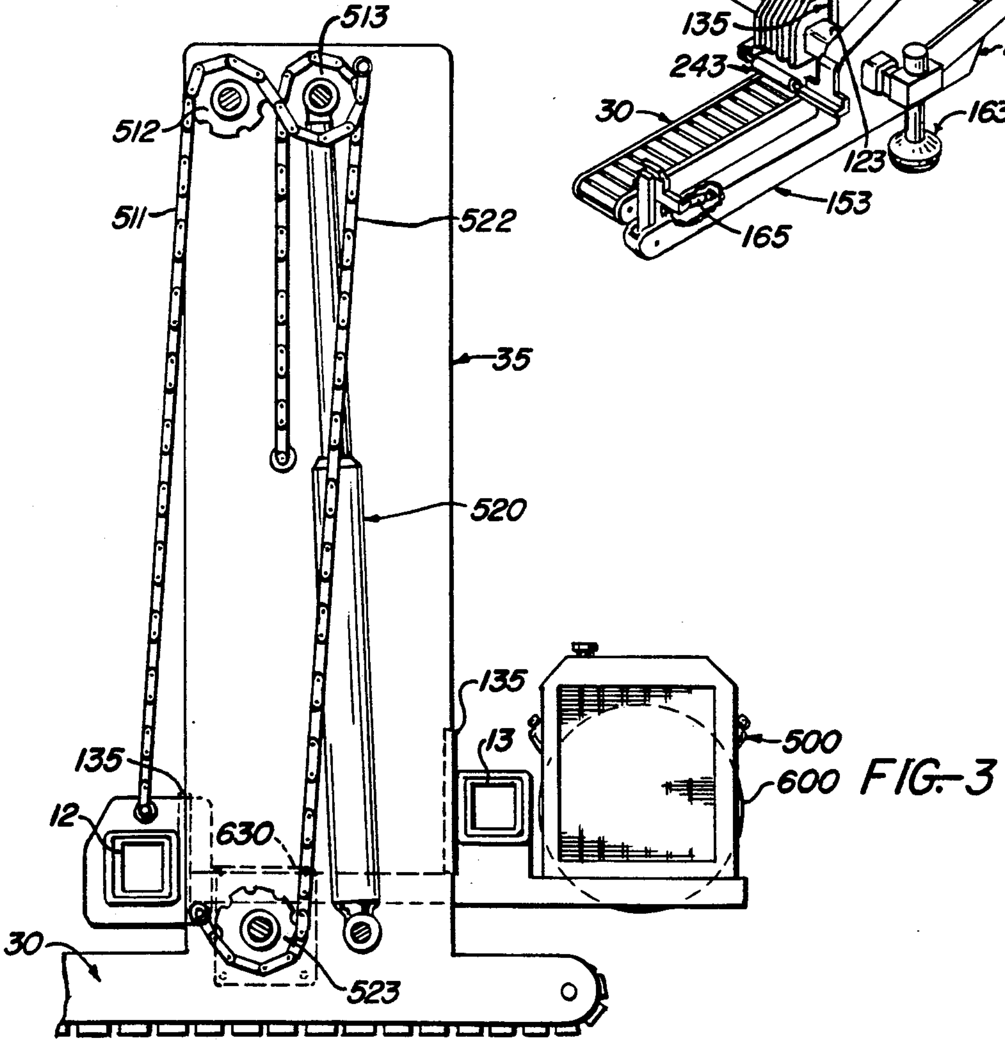
FIG. 3 is a side view, in partial section, of a typical hoisting column useful with the present invention.
Figure 4:
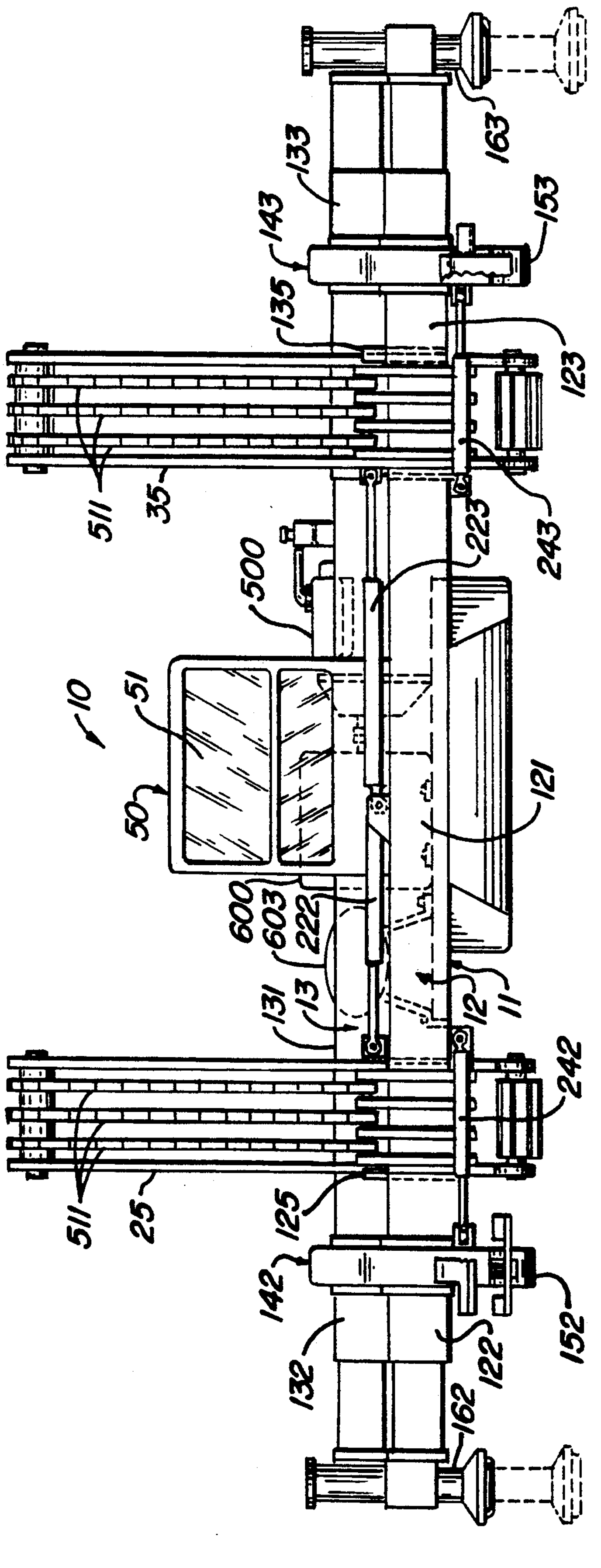
FIG. 4 is a front view of the inventive lifting assembly.

It should be noted that the invention summarized above takes benefit of full mobility. Thus, the inventive lifting assembly is useful any place along a rail line at which a substantially flat surface obtains. Characteristically, the tracks of a rail line include, with some frequency, sections at which the road surface is raised to the level of the track. These sections allow for vehicle rail crossings, for various loading operations and, occasionally, for pedestrian traffic.

Since the frequency of such raised surfaces along any rail line is presently substantial a loading mechanism operating from such surfaces is virtually unconstrained in its location. It is such a loading mechanism that is disclosed herein.

As shown in FIGS. 1-4 the inventive loading assembly, generally designated by the numeral 10, comprises a substantially rectangular beam frame 11 characterized by a front and rear transverse beam assembly 12 and 13 each conformed for telescopic expansion. More precisely, beam assembly 12 includes a center beam segment 121 of substantially rectangular section received in a rectangular fitting 122 and 123 at each end. Similarly, the rear beam assembly 13 inserts a center beam segment 131 into two end fittings 132 and 133. Between fittings 122 and 132 and 123 and 133 vertical slides 125 and 135 are formed, selected in dimension to receive a first vertical column 25 and a second vertical column 35. Each vertical column 25 and 35 is supported on an endless track assembly designated 20 and 30, respectively.

A pair of hydraulic actuators 222 and 223 extend from the center segment 121 to the fittings 122 and 123 respectively which, by coordinated hydraulic control, described below, expand or contract the spacing between the fittings or translate laterally the center segment. Thus, the spacing between the fittings and their alignment on each center beam are fully adjustable, for controlling loading geometry and for fine adjustment. This control is effected by an operator housed in an enclosure 50 stradling the front and rear beam segments 121 and 131.

Extending from the distal ends of fittings 122 and 132 and 123 and 133 are further adjustable end slides 142 and 143 from which cantilevered loading beams 152 and 153 extend in a direction of the track assemblies 20 and 30. Once again, a set of hydraulic actuators 242 and 243 controls the sliding extension of the end slides 142 and 143. It is these actuators that provide the fine horizontal adjustment of the loading beams under the trailer T prior to loading engagement. Each one of the end slides 142 and 143, moreover, includes a vertical, hydraulically extended lift pad or pivot post 162 and 163 which, when selectively extended, act as pivots for the opposite track, or together fix the position of the assembly 10.

Once engaged on the vertical columns 25 and 35 the whole beam assembly 11 is controlled in its vertical deployment by a set of ascent (lift) chains 511 and 522 then engage the slides 135 (and 125 by the same example) thus moving the slide along the corresponding column in accordance with the actuator extension.

In this manner the horizontal plan form between the loading beams 152 and 153 is fully adjustable and the height is selected by the extension of actuator 520. The advancement of this adjustable geometry is then controlled by selective rotary power to each track and by selective extension of the lift pads.

To effect such control over track advancement each track 20 and 30 is provided with a corresponding hydraulic motor 20 and 630 effected through a control assembly 650 in circuit with a hydraulic pump 600. A power plant 500, at the rear of the housing 50, then drives the pump 600. Of course, the control assembly 650 may also include the necessary other controls to effect the actuator motion described above.

Figure 5:
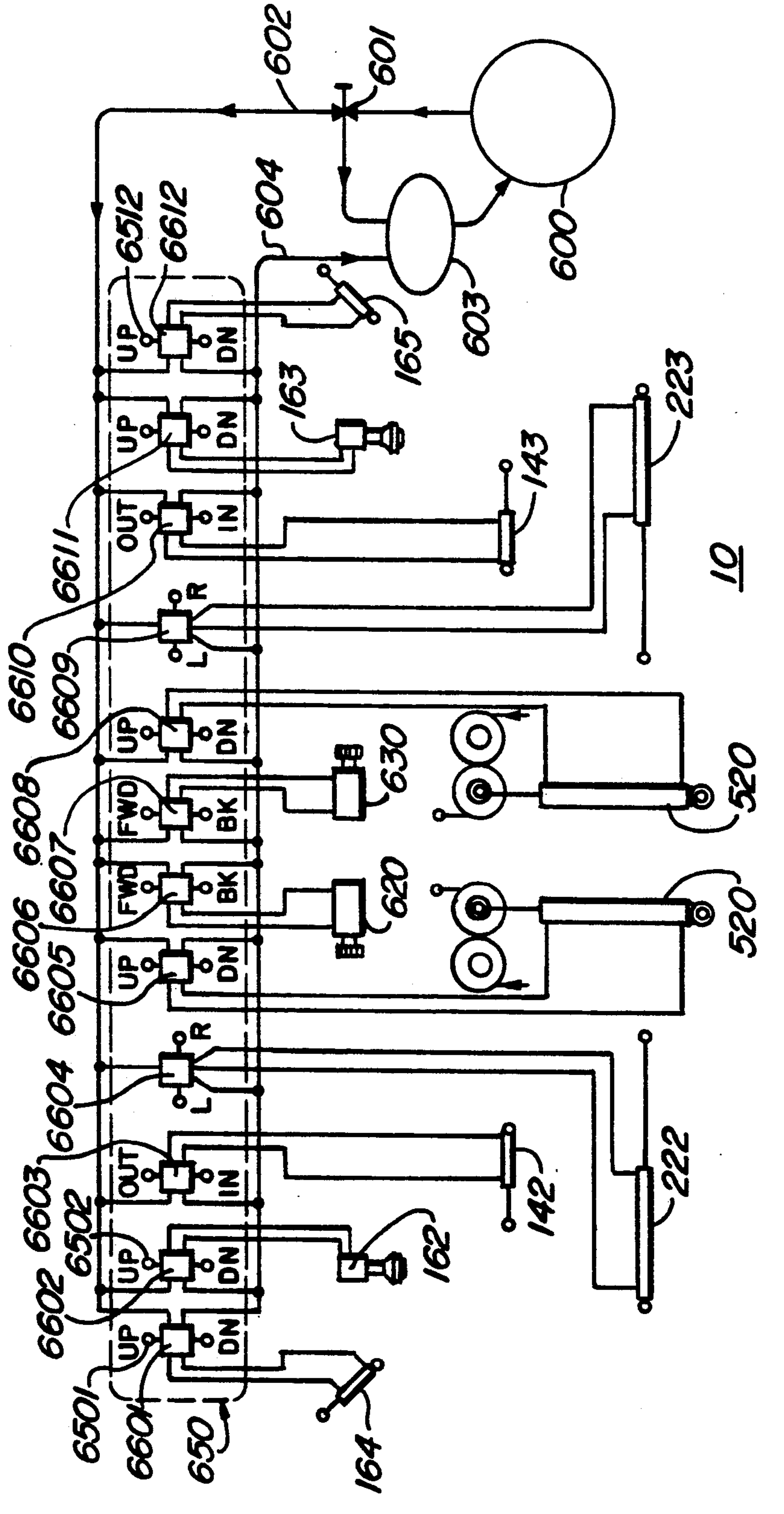
FIG. 5 is a diagrammatic illustration of the hydraulic power system useful with the present invention.

As shown in FIG. 5 the hydraulic circuit from the hydraulic pump 600 includes a pressure regulator 601 on the high pressure side of the pump. Pressure regulator 601 then feeds the regulated pressure line 602 with the excess fluid created during regulation returned to a reservoir 603 which also receives the return fluid through the low pressure line 604. Of course, the fluid collected in reservoir 603 is then recirculated back to the input of pump 600.

Thus, a high and low pressure side is developed across the pump 600 by way of constant circulation. It is between these high and low levels that all power is developed for the actuations described herein. More precisely, a set of control levers 6501 through 6512 comprise the control assembly 650, each control lever being tied to a corresponding control valve 6601 through 6612. Control valves, in the manner known in the art, direct the high and low pressure fluids in lines 602 and 604 to the ends of the corresponding control actuators. Thus, for example, control valve 6603 controls the extension or contraction of actuator 142, valve 6604 controls actuator 222, valve 6605 controls one of the lifting actuators 520 with the other actuator 520 being controlled by valve 6608. Valves 6606 and 6607 then control the high and low pressure flow rates to the hydraulic motors 620 and 630.

In a similar manner the remainder of the assembly is controlled, control valve 6609 controlling the other horizontal actuator 223, valve 6610 controlling actuator 143, and valve 6611 controlling the pivot post 163. These valves and their control levers are positioned within the operator's console 50, adjacent the viewing window 51. In this manner the operator is aligned with the platform 11 with a direct view at the lifting engagement.

Figure 6:
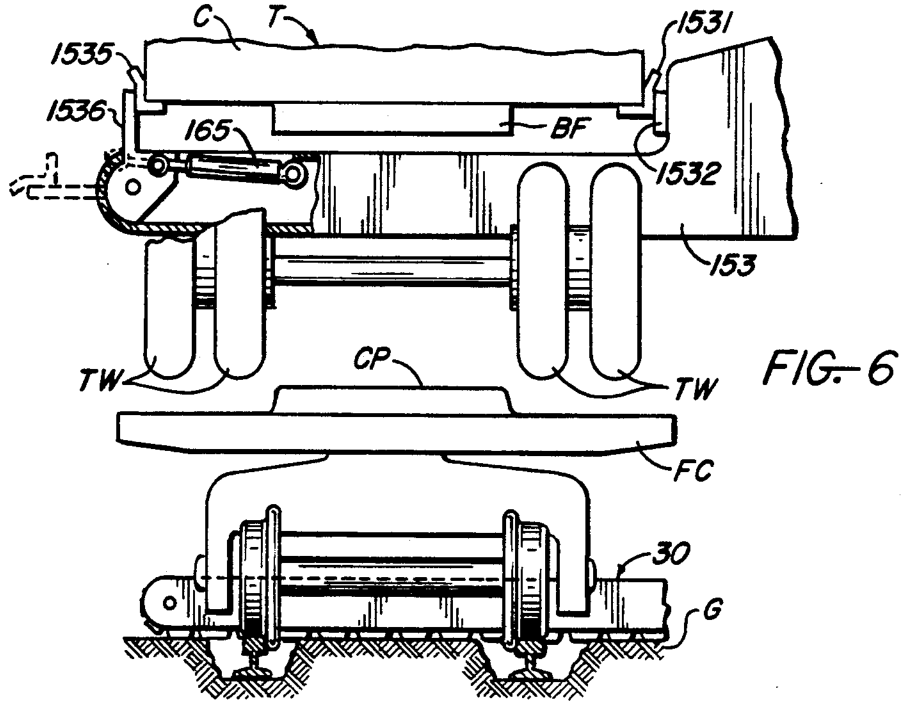
FIG. 6 is a side view detail of the trailer engagement mechanisms useful with the invention herein.

As shown in FIG. 6 each of the hoisting beams 152 and 153 (shown by reference to beam 153, it being understood that the other beam 152 is similarly implemented) includes an inner angular lift pad 1531 extending from a vertical brace 1532 on the beam surface. Brace 1532 is of a dimension greater than the depth of the trailer logic frame BF on which the container C is supported and thus will engage, on alignment, one edge of the container. At the free end another angular lift pad 1535 is fixed to the end of a pivotal bracket 1556 pinned to the hoisting beam 153, with the bracket articulated by a hydraulic cylinder 165 from a horizontal to a vertical alignment. It is this hydraulic cylinder 165 that responds to the control inputs issued from the control lever 6512. (A similar hydraulic cylinder 164, controlled by lever 6501, is found at the end of hoisting beam 152.)

In practice, beams 152 and 153 are passed under the trailer bogie frame BF with the end bracket 1536 extended horizontally. To fit under the trailer frame the hoisting beams, together with platform 11, are lowered to align adjacent tracks 20 and 30. The trailer is then lifted to the position shown in FIG. 6 and the tracks are then advanced on the raised ground surface G to pass under the railroad flat car FC. Preferrably, the loading surface of car FC includes a raised centering projection CP straddled by the trailer wheels TW. The trailer is then lowered and tied to the flat car.

Figure 7:
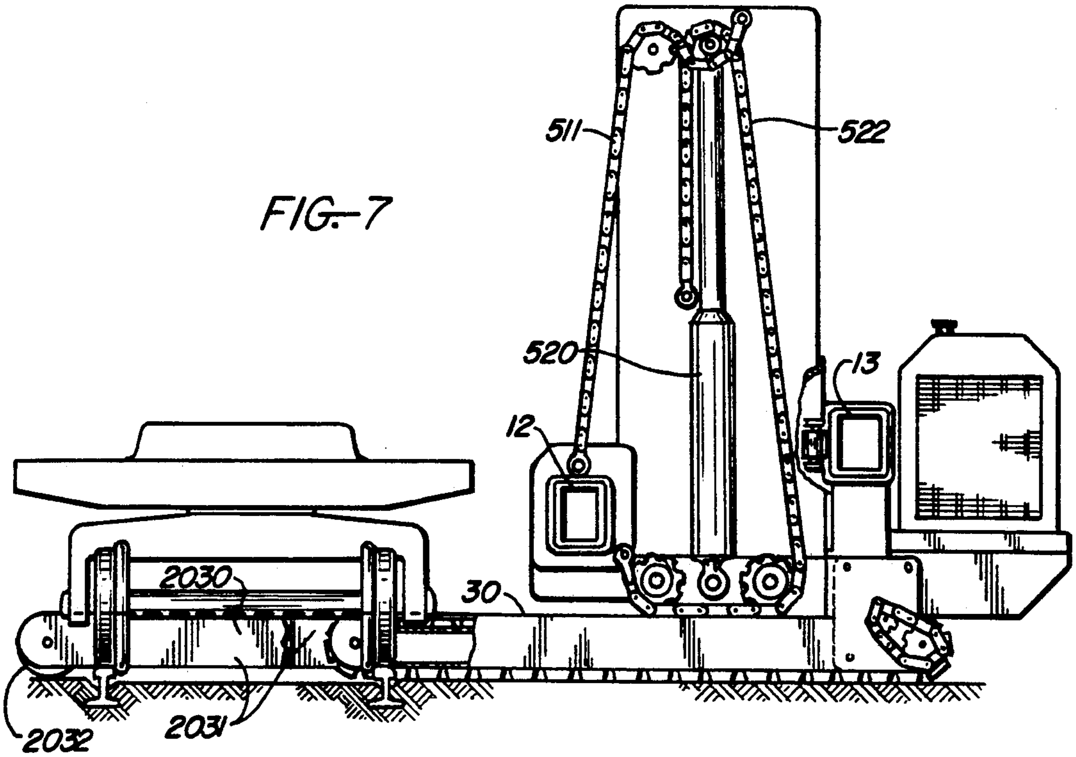
FIG. 7 is yet another side view of an alternative support system useful with the present invention.

It should be noted that the foregoing arrangement requires a sufficiently small vertical profile of the tracks 20 and 30 to clear any structure suspended below the flat car FC. This narrow profile may be variously achieved, as shown by example in FIG. 7 wherein an alternate supporting carriage is devised by way of two partial tracks 2020 and 2030 fixed between side plates 2021 and 2031 each extending beyond the corresponding tracks to retain corresponding end rollers 2022 and 2032. Of course, the partial tracks may be driven in the same manner as that previously described.

Obviously many modifications and changes may be made to the foregoing description without departing from the spirit of the invention. It is therefore intended that the scope of the invention be determined solely on the claims appended hereto.

What is claimed is:

1. A mobile lifting assembly for lifting wheel supported trailer combinations and transporting same onto individual flat bed rail cars of a rail train, comprising:

a substantially rectangular beam frame characterized by a front beam and a rear beam, said front and rear beams being fixed in a generally parallel spaced relationship relative each other by a first and second end plate attached between proximate ends thereof;

a first and second mount fixture each slidably engaged to said front and rear beams, intermediate said end plates, each said first and second mount fixture being conformed for sliding translation along said front and rear beams, each said first and second mount fixture further including:

a corresponding first and second generally vertical slide aperture extending between said front and rear beams;

a first and second support assembly each including a generally vertical column each conformed for sliding receipt in a corresponding one of said first and second slide apertures, said first and second support assembly each being supported for mobile translation on ground by a corresponding first and second caterpillar track each aligned in a direction generally orthogonal relative said front and rear beams, each said first and second track being conformed for passage subjacent said trailer combination;

an operator housing mounted on said front and rear beams intermediate said first and second mount fixture;

a first and second lifting beam assembly slidably engaged to said front and rear beam distal of said first and second mount fixtures, each said first and second lifting beam assembly including a generally horizontal lifting beam conformed for passage subjacent said trailer combination;

first hydraulic means connected between said housing and said first and second mount fixture, for sliding advancement of said first and second fixture along said front and rear beam relative said housing; and second hydraulic means connected between said first lifting beam assembly and said first fixture and said second lifting beam assembly and said second fixture for sliding advancement of said first and second beam assemblies relative to corresponding ones of said first and second fixtures.

2. Apparatus according to claim 1 further comprising:

control means mounted within said housing and connected to said first and second hydraulic means for controlling a hydraulic articulation thereof.

3. Apparatus according to claim 2 further comprising:

a source of motive power operatively connected to said first and second caterpillar track; and regulating means mounted in said housing and connected to said source for controlling an engagement thereof with said first and second caterpillar track.

4. Apparatus according to claim 2, further comprising:

a first and second hydraulically extendable pivot post mounted at said end plates of said front and rear beams for providing a pivot point against the ground upon extension thereof.

5. Apparatus according to claim 1 wherein:

each said first and second lifting beam assembly is provided with a corresponding first and second hydraulically articulated brackets each pivoted from a free end of a corresponding one of said lifting beams.

* * * * *